Patented Aug. 25, 1953

2,650,220

UNITED STATES PATENT OFFICE 2,650,220

TRIAZINE DERIVATIVE

John J. Roemer, Stamford, and Donald W. Kaiser, Old Greenwich, Conn., assignors to American Cyanamid Company, New York, N. Y., a corporation of Maine No Drawing. Application June 18, 1952, Serial No. 294,256

2 Claims. (Cl. 260—249.8)

The present invention relates to a new composition of matter, 2-thiocyano-4,6-diamino-s-triazine, of the formula

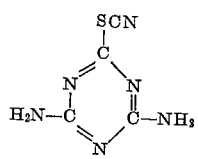

and to a method for its preparation.

The new compound can be prepared by reacting thiocyanic acid with a 2-halo-4,6-diamino-s-triazine in water, followed by neutralization with alkali. The following example is illustrative.

Example

Potassium thiocyanate (195 g., 2 moles) was dissolved in 500 cc. of water and hydrochloric acid (170 cc., 2 moles) was added to form an aqueous solution of thiocyanic acid. This solution was prepared and used in the cold (0–10° C.) to minimize decomposition. There was then added 25 g., 0.17 mole of 2-chloro-4,6-diamino-s-triazine. It dissolved rapidly, and the solution developed a deep red color. The solution was then filtered to remove a small amount of suspended matter, and the filtrate was neutralized in the cold with 20% NaOH to a pH of about 5. The resultant yellow precipitate (25 g., 90.5% yield) was extracted with acetone, in which it was readily soluble. Evaporation of the acetone gave the desired compound, free from chlorides.

The new compound is useful as an insecticide, as an antioxidant, and as an intermediate in the preparation of triazine derivatives, synthetic resins, dyes, and the like.

While the invention has been described with particular reference to specific embodiments, it is to be understood that it is not to be limited thereto but is to be construed broadly and restricted solely by the scope of the appended claims.

We claim:
1. 2-thiocyano-4,6-diamino-s-triazine.
2. The method of preparing 2-thiocyano-4,6-diamino-s-triazine that comprises reacting thiocyanic acid with 2-chloro-4,6-diamino-s-triazine in water, followed by neutralizing the resultant solution and recovering the precipitated triazine product.

JOHN J. ROEMER.
DONALD W. KAISER.

No references cited.